US008151657B2

(12) United States Patent
Park

(10) Patent No.: US 8,151,657 B2
(45) Date of Patent: Apr. 10, 2012

(54) INPUT DEVICE OF INSPECTION SYSTEM FOR FLAT PANEL DISPLAY

(75) Inventor: Sang-Hun Park, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 561 days.

(21) Appl. No.: 12/314,925

(22) Filed: Dec. 18, 2008

(65) Prior Publication Data

US 2009/0178498 A1 Jul. 16, 2009

(30) Foreign Application Priority Data

Jan. 14, 2008 (KR) ........................ 10-2008-0003937

(51) Int. Cl.
*H04N 17/02* (2006.01)

(52) U.S. Cl. ....................... 73/865.8; 73/865.9; 348/189

(58) Field of Classification Search ................... 348/189
See application file for complete search history.

(56) References Cited

U.S. PATENT DOCUMENTS 5,237,598 A * 8/1993 Albert .......................... 378/98.6
6,139,429 A * 10/2000 Shoemaker, Jr. .................. 463/7
7,391,510 B2 * 6/2008 Ben-Tulila et al. ........ 356/237.1
2005/0097773 A1 * 5/2005 Gardner .......................... 34/606

FOREIGN PATENT DOCUMENTS

KR 1020060060785 A 6/2005
KR 1020050070781 A 7/2005
KR 1000766946 B1 10/2007
KR 1020080001960 1/2008

* cited by examiner

*Primary Examiner* — Hezron E Williams
*Assistant Examiner* — Paul West
(74) *Attorney, Agent, or Firm* — Robert E. Bushnell, Esq.

(57) ABSTRACT

An input device that inputs a failure signal of a flat panel display in which a failure is found in a process of inspecting flat panel displays of a mother substrate state is provided. The input device includes an input unit that is positioned in the front of a mother substrate and spaced apart from the mother substrate and that has a plurality of labels in which a kind of a failure is written and at least one selection button to generate a failure selection signal, a guide unit that includes a first guide rail that guides horizontal movement of the input unit and a second guide rail that guides vertical movement of the input unit, a position detector that detects a position of the input unit to generate a position signal, and a controller that receives a failure selection signal from the input unit and receives a position signal from the position detector to map failure information of the mother substrate.

10 Claims, 7 Drawing Sheets

INPUT DEVICE OF INSPECTION SYSTEM FOR FLAT PANEL DISPLAY

CLAIM OF PRIORITY

This application makes reference to, incorporates the same herein, and claims all benefits accruing under 35 U.S.C. §119 from an application for INPUT DEVICE OF INSPECTION SYSTEM FOR FLAT PANEL DISPLAY earlier filed in the Korean Intellectual Property Office on the 14 Jan. 2008 and there duly assigned Serial No. 10-2008-0003937.

BACKGROUND OF THE INVENTION

1. Field of the Invention

The present invention relates to an input device of an inspection system for a flat panel display. More particularly, the present invention relates to an input device that transmits a failure signal of a flat panel display in which a failure is found in a process of inspecting flat panel displays of a mother substrate.

2. Description of the Related Art

For a flat panel display that displays an image, an organic light emitting diode (OLED) display, a liquid crystal display (LCD), and a plasma display panel (PDP) are well known. During a manufacturing process, a plurality of the flat panel displays can be simultaneously fabricated in a mother substrate. Once the fabrication of the plurality of the flat panel displays is completed, the flat panel displays are separated from each other through cutting, and a driving circuit is mounted in an electrode pad of each of the separated flat panel displays.

An image quality inspection of the flat panel display is separately performed in each of the separated flat panel displays, and in this case, longer time is required for an inspection of the all of flat panel displays that are simultaneously produced in a large quantity from the mother substrate. Therefore, a method of simultaneously inspecting a plurality of flat panel displays in a mother substrate is developed. In this method, electrodes for an inspection, which is electrically connected to driving electrodes of each flat panel display, are provided in the mother substrate, and the electrodes for an inspection are drawn to an edge of the mother substrate to form an electrode pad.

The electrode pad is connected to a contact pin of the inspection system to receive a driving voltage. By simultaneously driving a plurality of flat panel displays that is provided in the mother substrate, an image quality inspection is performed. In this process, when a failure is found in a specific flat panel display, an operator inputs a kind of a failure and the position of the flat panel display, which is determined to be failed, to a computer, thereby selecting the flat panel display in which a failure is found.

One of methods of inputting a failure signal is performed, when the operator touches by hand a flat panel display that is determined to be a failure, by detecting a touch position by a sensor that is attached to an inspection system, by generating a position signal of a flat panel display in which a failure is generated, and by transferring the position signal to a computer. Thereafter, the operator goes to a location where a monitor is provided, and inputs a kind of a failure using a keypad while checking the monitor.

However, in the above-described input method, because the operator touches the flat panel display by pressing the front of the flat panel display, another failure may be generated by pressure that is applied by the operator. In addition, because the location of the inspection system and the location of the monitor and keypad are separated, the operator has to commute between the inspection system, in which the mother substrate is provided, and the location of the monitor and keypad in which the operator inputs a kind of a failure. Therefore, an input error may be generated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an input device of an inspection system for a flat panel display having advantages of removing a failure generating factor according to a touch by generating a position signal of a flat panel display in which a failure is generated while an operator does not touch a flat panel display and minimizing a possibility of an input error by allowing the operator to input a kind of a failure in front of a mother substrate.

An exemplary embodiment of the present invention provides an input device of an inspection system for a flat panel display that includes an input unit that is positioned in the front of a mother substrate and spaced apart by a distance from the mother substrate, a first guide rail, a second guide rail, a position detector, and a controller. A plurality of flat panel displays is formed in the mother substrate. The input unit includes a plurality of labels showing kinds of failures, and includes at least one selection button to generate a failure selection signal. The first guide rail is positioned parallel to a horizontal edge of the mother substrate to guide a horizontal movement of the input unit. The second guide rail is positioned in parallel to a vertical edge of the mother substrate to guide a vertical movement of the input unit. The position detector detects a position of the input unit and generates a position signal. The controller receives a failure selection signal from the input unit and receives a position signal from the position detector, and the controller maps failure information of the mother substrate.

The input unit may include a rotation dial to which the plurality of labels is attached, and an indication point that is positioned at the center of the rotation dial. Alternatively, the input unit may include a plurality of selection buttons. Each of the labels is provided on one of the selection buttons.

The first guide rail may include an upper guide rail and a lower guide rail. The upper guide rail is positioned in the front of an upper edge of the mother substrate, and the lower guide rail is positioned in the front of a lower edge of the mother substrate. The second guide rail may include a horizontal movement member at one end thereof and another horizontal movement member at another end thereof. The horizontal movement member is coupled to the upper guide rail and the another horizontal movement member is coupled to the lower guide rail. The second guide rail may include a vertical movement member that is coupled to the input unit. The vertical movement member moves along the second guide rail. The first guide rail may include a stopper provided at both ends of the upper guide rail to prevent a separation of the second guide rail.

The position detector may include a first sensor that is provided at the first guide rail to detect a horizontal position of the input unit and a second sensor that is provided at the second guide rail to detect a vertical position of the input unit. The position detector may generate a position signal of the input unit at a time point when the input unit transmits a failure selection signal to the controller.

The input device may further include a display unit that is coupled to the input unit and that displays information that is received from the controller. The display unit may be positioned between the vertical movement member and the input unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
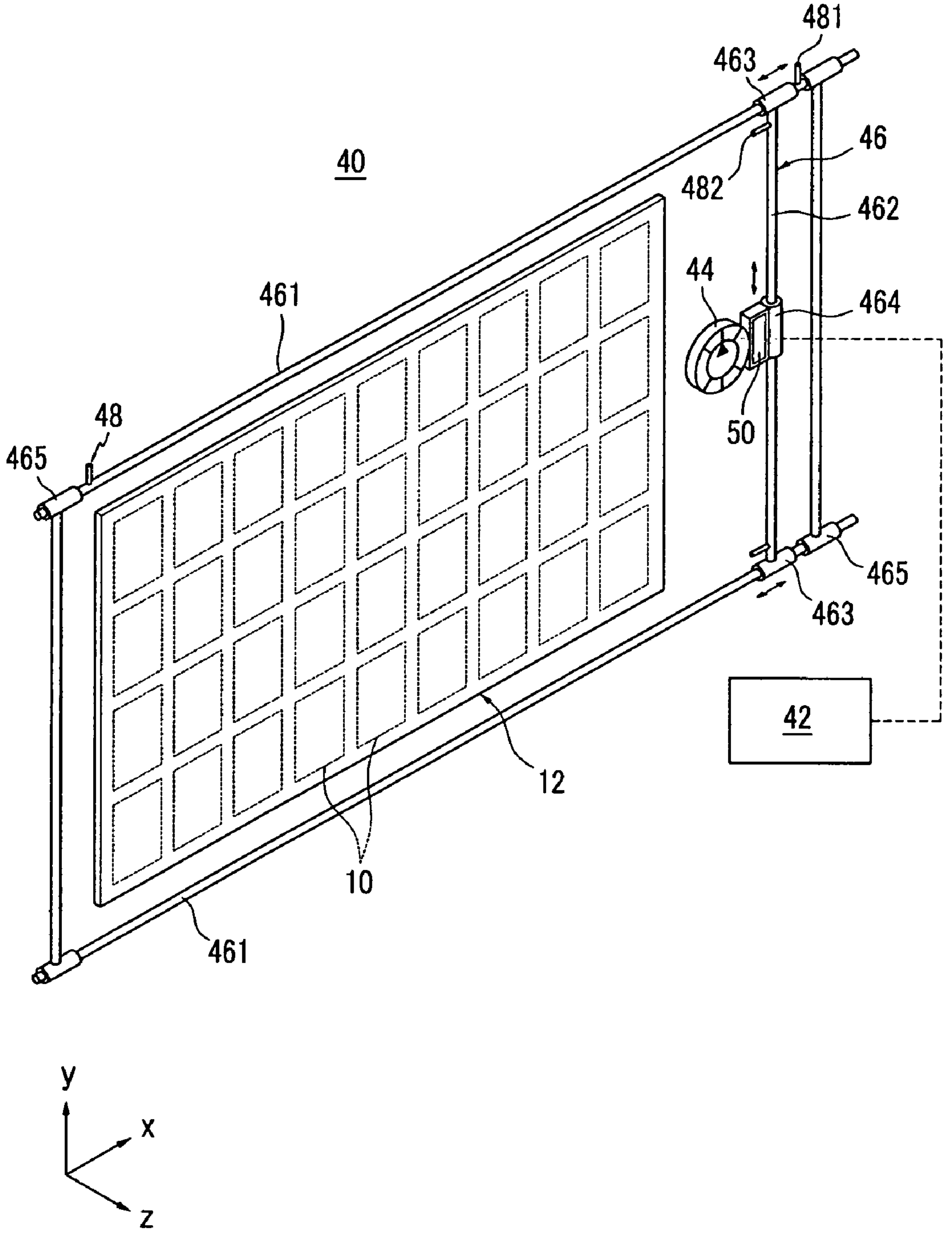
FIG. 1 is a perspective view illustrating an input device of an inspection system for a flat panel display according to an exemplary embodiment of the present invention.

FIG. 1 is a perspective view illustrating an input device of an inspection system for a flat panel display according to an exemplary embodiment of the present invention.

Referring to FIG. 1, the inspection system receives a mother substrate 12 having a plurality of flat panel displays 10 to simultaneously drive the plurality of flat panel displays 10, thereby inspecting image quality and characteristics thereof. An input device 40 of the present exemplary embodiment is disposed in the front of the mother substrate 12 that is fixed to the inspection system, and performs a function of transmitting a position signal and a failure selection signal indicating a kind of a failure of the flat panel display 10, in which a failure is found, to the controller 42 by an operator manipulation.

Particularly, the input device 40 can generate a position signal of the flat panel display 10 in which a failure is generated while an operator does not touch the flat panel display 10 in which a failure is generated, and allows the operator to select and input a kind of a failure, in front of the mother substrate 12, while viewing the flat panel display 10 in which a failure is generated.

The mother substrate 12 that is provided in the inspection system and the flat panel display 10 that is manufactured in the mother substrate 12 are described as follows.

Figure 2:
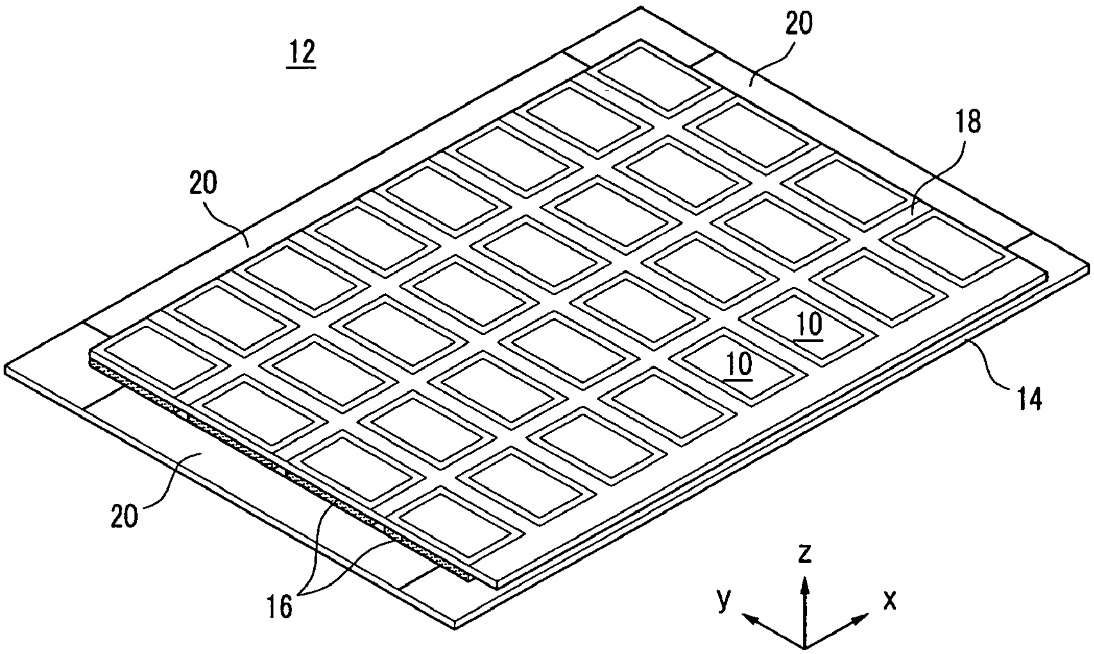
FIG. 2 is a perspective view of the mother substrate that is shown in FIG. 1.

FIG. 2 is a perspective view of the mother substrate that is shown in FIG. 1. Referring to FIG. 2, the mother substrate 12 includes a first substrate 14 and a second substrate 18 that is formed in a size smaller than the first substrate 14 and that is bonded to the first substrate 14 by a sealing member 16. The sealing member 16 is positioned apart by a distance from each of the flat panel displays 10 and forms a predetermined internal space together with the first substrate 14 and the second substrate 18.

In each flat panel display 10, a plurality of driving electrodes and a plurality of emission layers in which intensity of emitting light is controlled by the driving electrodes are positioned in at least one of the first substrate 14 and the second substrate 18.

In the first substrate 14, at least two edges extend beyond the second substrate 18 to form an electrode pad 20 on the edges. The electrode pad 20 is a pad of electrodes for an inspection, and the electrodes for an inspection are electrically connected to driving electrodes of the each flat panel display 10. The electrodes for an inspection are positioned between the flat panel displays 10, and do not remain in the flat panel display 10 after the mother substrate 12 is cut.

In FIG. 2, for example, three edges of the first substrate 14 extend to the outside of the second substrate 18, and the electrode pad 20 is formed on the edges. However a shape of the mother substrate 12 is not limited thereto. After performing a screen inspection and an aging inspection for the plurality of flat panel displays 10, the mother substrate 12 is separated from the sealing member 16 to form individual flat panel displays 10.

Figure 3:
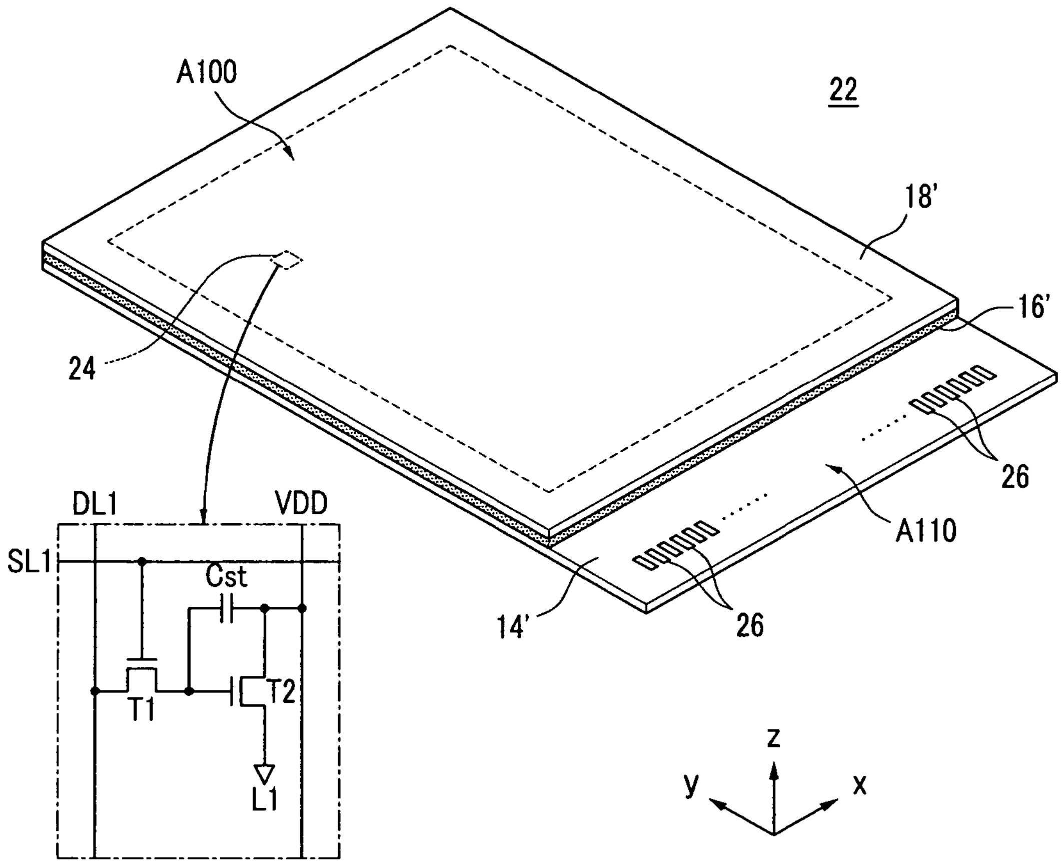
FIG. 3 is a perspective view illustrating a flat panel display included in the mother substrate that is shown in FIG. 2.
Figure 4:
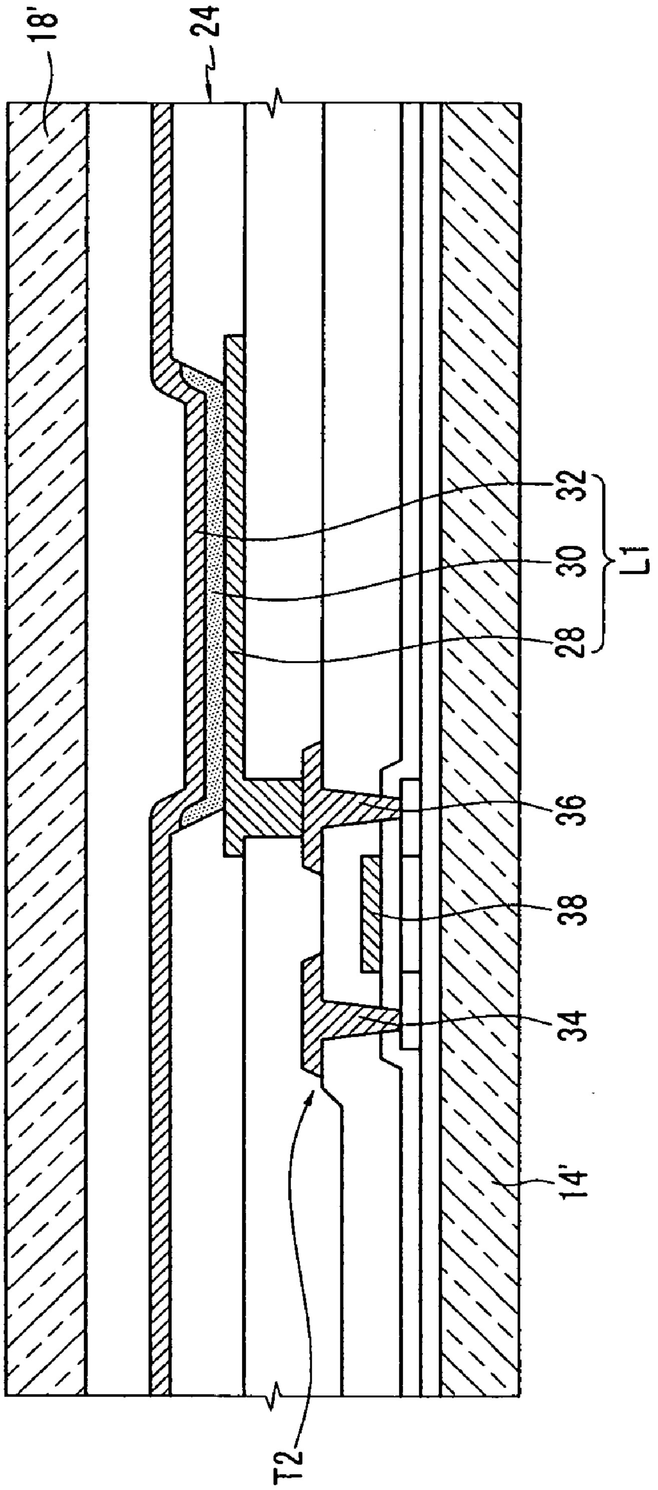
FIG. 4 is a partially enlarged cross-sectional view of the flat panel display that is shown in FIG. 3.

FIG. 3 is a perspective view illustrating a flat panel display included in the mother substrate that is shown in FIG. 2. FIG. 4 is a partially enlarged cross-sectional view of the flat panel display that is shown in FIG. 3. In FIGS. 3 and 4, as an example of a flat panel display, an organic light emitting diode (OLED) display is illustrated.

Referring to FIGS. 3 and 4, the OLED display 22 includes a first substrate 14' and a second substrate 18' that are bonded by a sealing member 16'. A display area A100 in which image display is actually performed is positioned at the inside of the sealing member 16', and an exposed portion of the first substrate 14' forms a pad area A 10 at the outside of the sealing member 16'. The second substrate 18' has a moisture absorbent (not shown) at the inside thereof.

A plurality of sub-pixels 24 is disposed in a matrix format in the display area A100 of the first substrate 14', and a scan driver (not shown) and a data driver (not shown) that drive the sub-pixels 24 are positioned between the display area A 100 and the sealing member 16' or at the outside of the sealing member 16'. Pad electrodes 26 for transferring an electric signal to the scan driver and the data driver are positioned at the pad area A 10 of the first substrate 14'.

Each sub-pixel 24 includes a light emitting element L1 and a driving circuit. The light emitting element L1 includes an anode electrode 28, an organic emission layer 30, and a cathode electrode 32, and the driving circuit includes at least two thin film transistors and at least one storage capacitor Cst. The thin film transistor basically includes a first thin film transistor (hereinafter, referred to as a first TFT') T1 for switching, and a second thin film transistor (hereinafter, referred to as a second TFT') T2 for driving.

The first TFT T1 is connected to a scan line SL1 and a data line DL1, and transmits a data voltage that is input to the data line DL1 to the second TFT T2 according to a switching voltage that is input to the scan line SL1. The storage capacitor Cst is connected to the first TFT T1 and a power line VDD and stores a voltage corresponding to a difference between a voltage that is received from the first TFT T1 and a voltage that is supplied to the power line VDD.

The second TFT T2 is connected to the power line VDD and the storage capacitor Cst to supply an output current in proportional to the square of a difference between a voltage that is stored in the storage capacitor Cst and a threshold voltage to the light emitting element L1, and the light emitting element L1 emits light by an output current. The second TFT T2 includes a source electrode 34, a drain electrode 36, and a gate electrode 38. The anode electrode 28 of the light emitting element L1 can be connected to the drain electrode 36 of the second TFT T2. A configuration of the sub-pixel 24 is not limited to the above-described example and can be variously changed.

As an example of a flat panel display, the OLED display 22 has been explained, however an inspection system that is used in the input device 40 of the present exemplary embodiment can be effectively used for an inspection of other flat panel displays, for example a LCD or a PDP in addition to the OLED display 22.

Referring again to FIG. 1, the input device 40 includes an input unit 44 that is positioned in the front of the mother substrate 12 spaced apart by a distance from the mother substrate 12 and that generates a failure selection signal, a guide unit 46 that holds the input unit 44 and that moves the input unit 44 along a horizontal direction (x-axis in the drawing) and a vertical direction (y-axis in the drawing) of the mother substrate 12, a position detector 48 that detects a position of the input unit 44 and that generates a position signal, a controller 42 that receives a failure selection signal from the input unit 44 and receives a position signal from the position detector 48 to map failure information of the mother substrate 12, and a display unit 50 that is provided around the input unit 44 to display information that is transmitted by the controller 42.

Figure 5:
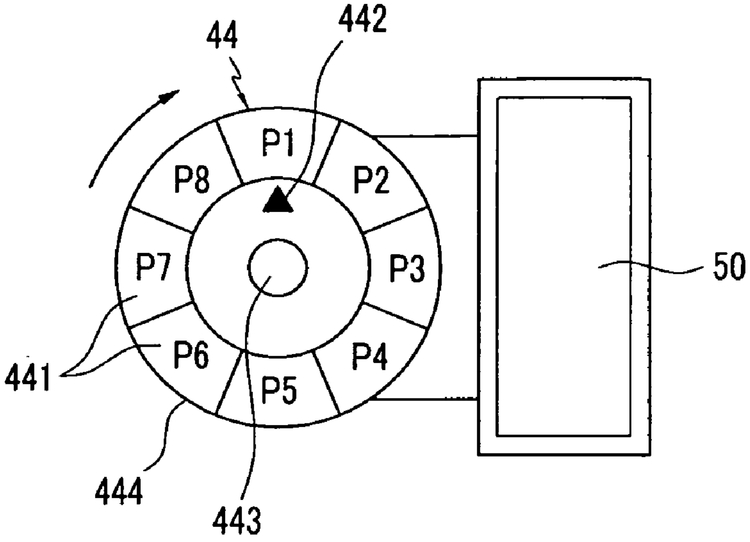
FIG. 5 is an enlarged top plan view of the input unit that is shown in FIG. 1.

FIG. 5 is an enlarged top plan view of an input unit that is shown in FIG. 1. Referring to FIG. 5, the input unit 44 includes a plurality of labels 441 in which kinds of failures are written, an indication point 442 that indicates a specific label 441 of the plurality of labels 441, and a selection button 443 that generates a failure selection signal corresponding to a failure of the label 441 that is indicated by the indication point 442.

The plurality of labels 441 can be disposed along an edge of a rotation dial 444. The selection button 443 and the indication point 442 can be disposed at the center of the rotation dial 444. Therefore, the operator can allow the indication point 442 to indicate a label 441 in which a failure that is intended by the operator is written by turning the rotation dial 444.

Figure 6:
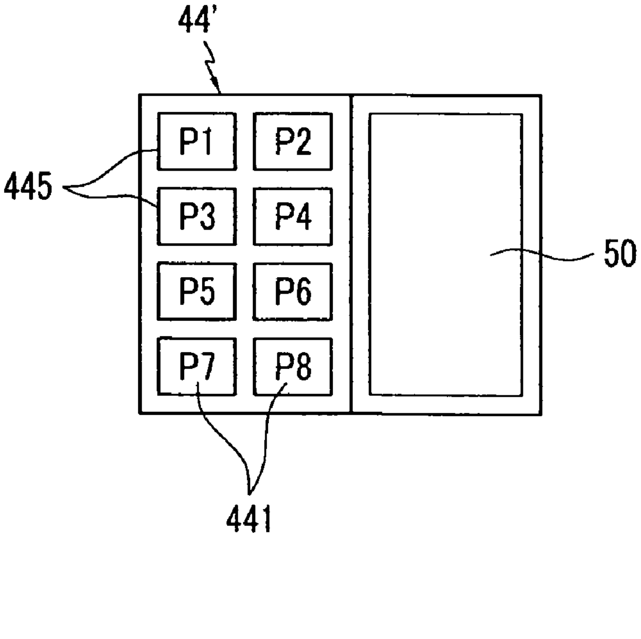
FIG. 6 is a top plan view illustrating another exemplary embodiment of the input unit that is shown in FIG. 1.

FIG. 6 is a top plan view illustrating another exemplary embodiment of the input unit that is shown in FIG. 1. Referring to FIG. 6, an input unit 44' includes a plurality of labels 441 in which kinds of failures are written and a plurality of selection buttons 445 that is provided in each label 441. In this case, the operator can generate a failure selection signal by pressing the selection button 445 corresponding to the label 441 in which a failure that is intended by the operator is written.

A configuration of the input unit 44 or 44' is not limited to the above-described two examples, and the input units can have various configurations in which the operator can select one of various kinds of failures and generate a failure selection signal thereof.

Referring again to FIG. 1, the guide unit 46 includes a pair of first guide rails 461 that is positioned parallel to a horizontal axis (or a horizontal edge) of the mother substrate 12. One of the first guide rails 461 (or an upper guide rail) is positioned in the front of an upper edge, and another of the first guide rails 461 (or a lower guide rail) is positioned in the front of a lower edge of the mother substrate 12. The guide unit 46 further includes a second guide rail 462 is positioned in parallel to a vertical axis (or a vertical edge) of the mother substrate 12. Both ends of the second guide rail are coupled to the first guide rails 461.

As both ends of the second guide rail 462 are provided in the first guide rail 461 by a pair of horizontal movement members 463, the second guide rail 462 moves along a horizontal direction of the mother substrate 12. As the vertical movement member 464, to which the input unit 44 is coupled is provided in the second guide rail 462, the input unit 44 and the vertical movement member 464 move along a vertical direction of the mother substrate 12.

As a rack (not shown) is provided in the first guide rail 461 and a pinion (not shown) is provided within the horizontal movement member 463, the horizontal movement member 463 can move along the first guide rail 461 through coupling of the rack and the pinion. As a rack (not shown) is also provided in the second guide rail 462 and a pinion (not shown) is also provided within the vertical movement member 464, the vertical movement member 464 can move along the second guide rail 462 through coupling of the rack and the pinion.

A coupled structure of the first guide rail 461 and the horizontal movement member 463 and a coupled structure of the second guide rail 462 and the vertical movement member 464 are not limited to the above-described example, and can be variously changed. Further, a stopper 465 is provided at both ends of the first guide rail 461 so that the second guide rail 462 may be not separated from the first guide rail 461.

A position of the input unit 44 can freely set by a horizontal movement of the second guide rail 462 and a vertical movement of the vertical movement member 464, and the input unit 44 can be easily moved to an upper part of a specific flat panel display 10 of the plurality of flat panel displays 10 that is provided in the mother substrate 12 according to the operator's intention.

A position detector 48 that detects a position of the input unit 44 can be provided in the guide unit 46. For example, the position detector 48 includes a first sensor 481 that is provided in the first guide rail 461 to detect a horizontal position of the second guide rail 462 and a second sensor 482 that is provided in the second guide rail 462 to detect a vertical position of the input unit 44. A structure of the position detector 48 is not limited to the above-described example and can be variously changed.

The display unit 50 performs a function of displaying information that is transmitted by the controller 42. It is preferable that the display unit 50 is provided around the input unit 44 to easily provide information to an operator who manipulates the input unit 44. For example, the display unit 50 may be disposed between the vertical movement member 464 and the input unit 44, and moves along a horizontal direction and a vertical direction of the mother substrate 12 together with the input unit 44 and the vertical movement member 464.

Figure 7:
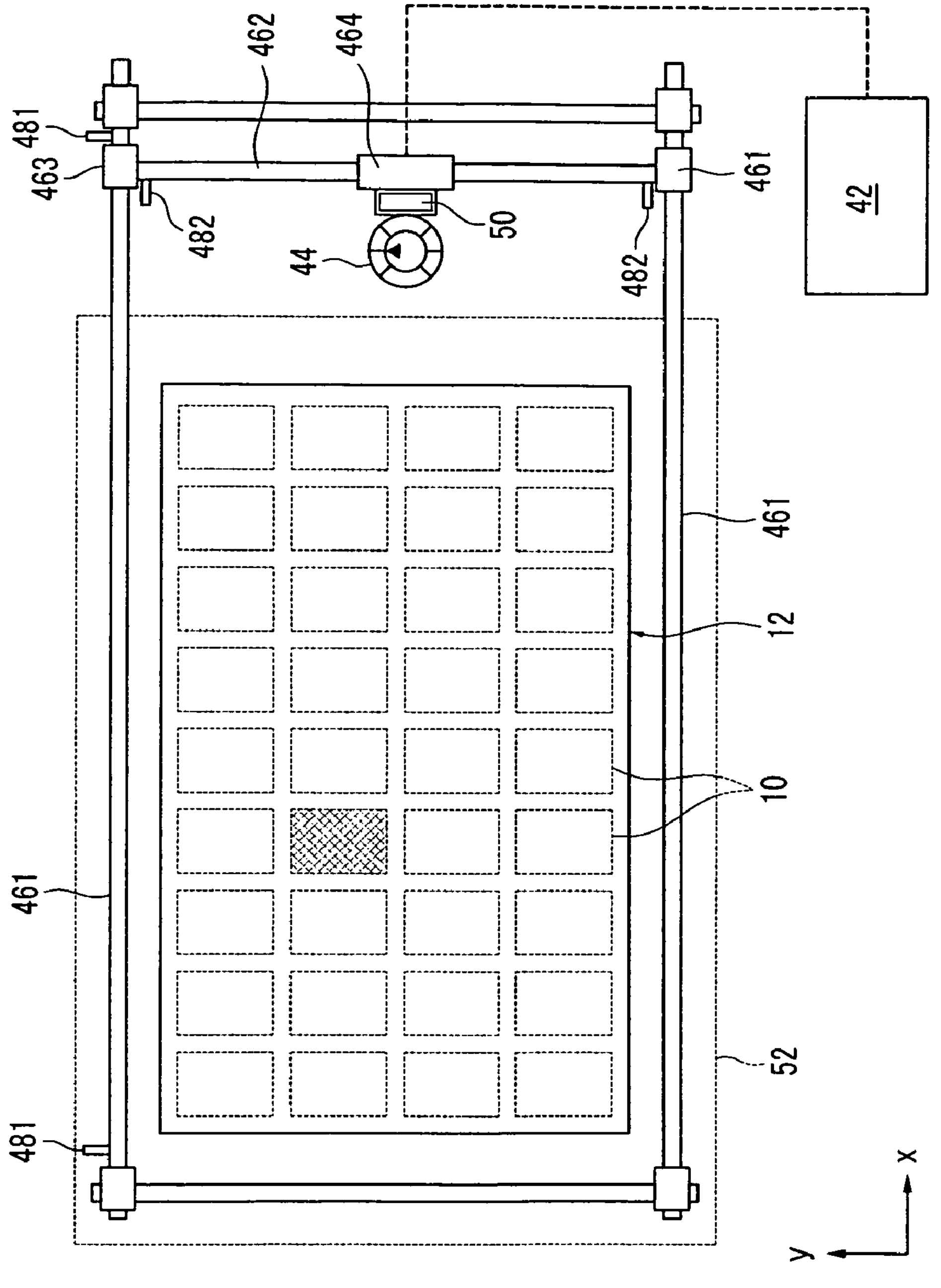
FIGS. 7 and 8 are top plan views of an input device during a process of an inspection.
Figure 8:
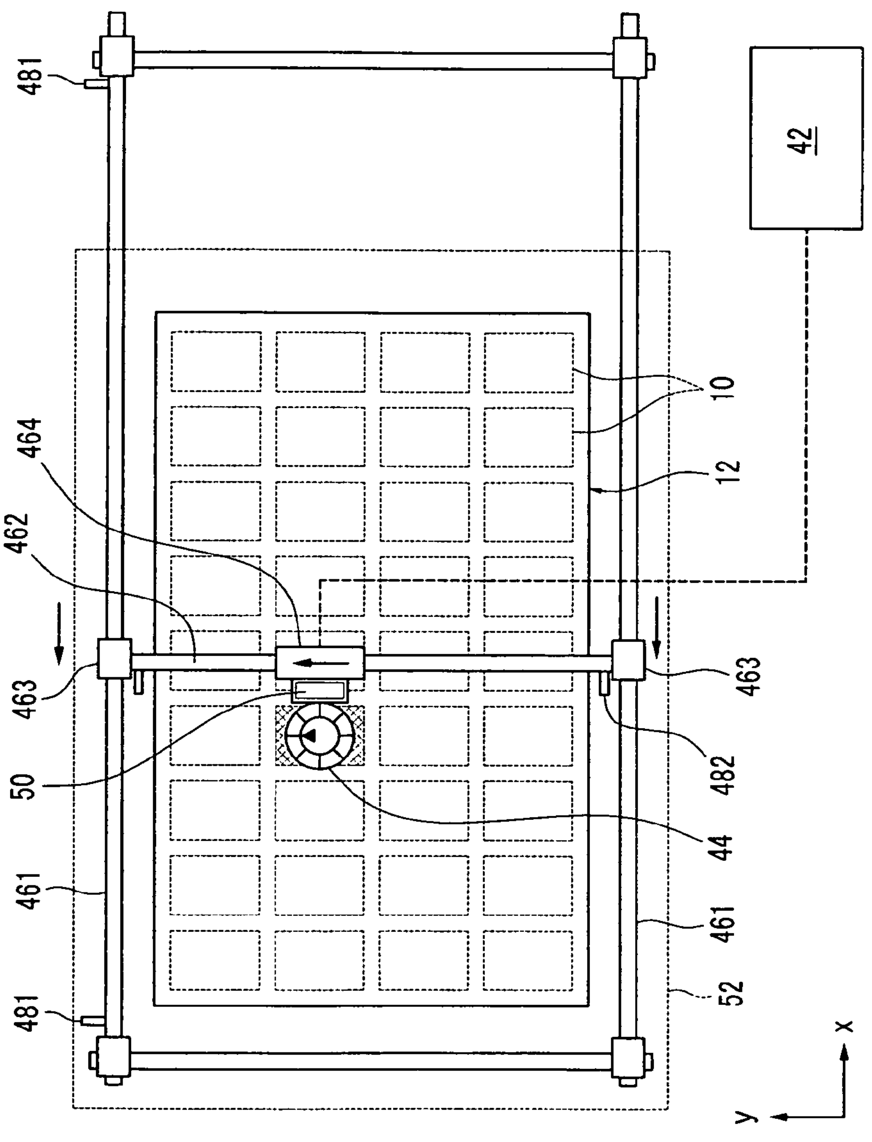

FIGS. 7 and 8 are top plan views of an input device during a process of an inspection. Referring to FIGS. 7 and 8, the mother substrate 12, in which the plurality of flat panel displays 10 is formed, is mounted in an inspection system 52, and a driving voltage is applied to the electrode pad 20 (see FIG. 2) that is provided in the mother substrate 12. Thereby, the plurality of flat panel displays 10 is simultaneously driven to inspect image quality and characteristics.

In this process, if a specific flat panel display 10 is determined as a failure, the operator moves the input unit 44 to a position at an upper part of the flat panel display 10 that is determined as a failure. In FIGS. 7 and 8, a flat panel display that is indicated by hatched lines is an example of a flat panel display that is determined as a failure.

The operator selects and inputs a kind of a failure of the flat panel display 10 in which a failure is generated by manipulating the input unit 44. In the plurality of labels 441 (see FIGS. 5 and 6) of the input unit 44, various kinds of failures such as a bright spot failure, a dark spot failure, a surface failure, a line failure, a stain failure, a driving failure, and a deposition mask failure may be written.

When the input unit 44 has a configuration that is shown in FIG. 5, the operator sets a specific label 441 to be positioned at a tip of an indication point 442 by turning a rotation dial 444, and inputs a kind of a failure by pressing the selection button 443. Alternatively, when the input unit 44' has a configuration that is shown in FIG. 6, the operator inputs a kind of a failure by pressing the selection button 445 corresponding to the specific label 441.

In this way, the input unit 44 or 44' generates a failure selection signal by a manipulation of the operator, and transmits the failure selection signal to the controller 42. In this case, at a time point at which the failure selection signal is generated, a first sensor 481 and a second sensor 482 operate to detect positions on a horizontal position and a vertical position of the input unit 44, thereby generating a position signal of the input unit 44. The position signal of the input unit 44 is a position signal of the flat panel display 10 on the mother substrate 12, in which a failure is generated, and is transmitted to the controller 42 together with a failure selection signal.

Accordingly, the controller 42 inputs a position signal and a failure selection signal to a database and performs a mapping operation of failure information of the mother substrate 12 by dividing a grade of a failure according to a preset mapping program. The controller 42 transmits a grade division result according to a failure regulation to the display unit 50, and controls the display unit 50 to display the contents.

Even if the operator does not touch the flat panel display 10 due to a structure of the guide unit 46 and the input unit 44, the input device 40 of the present exemplary embodiment can generate a position signal of the flat panel display 10 in which a failure is generated, and thus can substantially remove a failure generation factor according to a touch.

Further, by putting the input unit 44 on the flat panel display 10 that is determined to a failure and manipulating the input unit 44, the operator can input a kind of a failure and immediately check the input result through the display unit 50 that is provided around the input unit 44, whereby the operator's input error can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An input device of an inspection system for a flat panel display, comprising:

an input unit that is positioned in the front of a mother substrate and spaced apart by a distance from the mother substrate, a plurality of flat panel displays being formed in the mother substrate, the input unit including a plurality of labels showing kinds of failures, the input unit including at least one selection button to generate a failure selection signal;

a first guide rail that is positioned parallel to a horizontal edge of the mother substrate to guide a horizontal movement of the input unit;

a second guide rail that is positioned parallel to a vertical edge of the mother substrate to guide a vertical movement of the input unit;

a position detector that detects a position of the input unit and generates a position signal; and a controller that receives the failure selection signal from the input unit and receives the position signal from the position detector, the controller mapping failure information of the mother substrate.

2. The input device of claim 1, wherein the input unit comprises:

a rotation dial to which the plurality of labels is attached; and an indication point that is positioned at the center of the rotation dial, the indication point indicating one of the labels.

3. The input device of claim 1, wherein the input unit comprises at least two selection buttons, each of the labels being provided on one of the selection buttons.

4. The input device of claim 1, wherein:

the first guide rail includes an upper guide rail and a lower guide rail, the upper guide rail being positioned in the front of an upper edge of the mother substrate, the lower guide rail being positioned in the front of a lower edge of the mother substrate; and the second guide rail includes a horizontal movement member at one end thereof and another horizontal movement member at another end thereof, the horizontal movement member being coupled to the upper guide rail and the another horizontal movement member being coupled to the lower guide rail.

5. The input device of claim 4, wherein the second guide rail includes a vertical movement member that is coupled to the input unit, the vertical movement member moving along the second guide rail.

6. The input device of claim 5, further comprising a display unit that is provided between the vertical movement member and the input unit, the display unit displaying information that is received from the controller.

7. The input device of claim 4, wherein the first guide rail includes a stopper provided at both ends of the upper guide rail to prevent a separation of the second guide rail.

8. The input device of claim 1, wherein the position detector comprises:

a first sensor that is provided at the first guide rail to detect a horizontal position of the input unit; and a second sensor that is provided at the second guide rail to detect a vertical position of the input unit.

9. The input device of claim 1, further comprising a display unit that is coupled to the input unit, the display unit displaying information that is received from the controller.

10. The input device of claim 1, wherein the position detector generates the position signal of the input unit at a time point when the input unit transmits a failure selection signal to the controller.

* * * * *